United States Patent
Wei

(10) Patent No.: US 12,255,298 B2
(45) Date of Patent: Mar. 18, 2025

(54) BATTERY PACK HAVING HEAT DISSIPATION ASSEMBLY TO ASSIST HEAT DISSIPATION

(71) Applicant: Greenworks (Jiangsu) Co., Ltd, Jiangsu (CN)

(72) Inventor: Lv Wei, Jiangsu (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 0 days.

(21) Appl. No.: 18/381,690

(22) Filed: Oct. 19, 2023

(65) Prior Publication Data
US 2024/0047779 A1 Feb. 8, 2024

Related U.S. Application Data

(63) Continuation of application No. 17/029,494, filed on Sep. 23, 2020, now Pat. No. 11,830,993.

(30) Foreign Application Priority Data

Sep. 23, 2019 (CN) .......................... 201910899648.X

(51) Int. Cl.
| H01M 10/613 | (2014.01) |
| --- | --- |
| H01M 10/653 | (2014.01) |
| H01M 10/6551 | (2014.01) |
| H01M 10/659 | (2014.01) |
| H01M 50/213 | (2021.01) |

(52) U.S. Cl.
CPC ....... *H01M 10/613* (2015.04); *H01M 10/653* (2015.04); *H01M 10/6551* (2015.04); *H01M 10/659* (2015.04); *H01M 50/213* (2021.01)

(58) Field of Classification Search
CPC ............. H01M 10/613; H01M 10/653; H01M 10/6551; H01M 10/659; H01M 50/213
See application file for complete search history.

(56) References Cited

U.S. PATENT DOCUMENTS

| 5,879,833 | A | * | 3/1999 | Yoshii | ............... | H01M 10/6551 |
| | | | | | | 429/157 |
| 2009/0263708 | A1 | * | 10/2009 | Bender | ............... | H01M 10/643 |
| | | | | | | 429/120 |
| 2017/0125755 | A1 | * | 5/2017 | Kim | .................... | H01M 10/643 |

* cited by examiner

*Primary Examiner* — Jimmy Vo

(57) ABSTRACT

A battery pack comprises a battery cell assembly and a heat dissipation assembly. The battery cell assembly comprises a battery cell array and a channel arranged in the battery cell array. The battery cell array is formed by arranging a plurality of cells in a certain form. The channel is enclosed by N cells, wherein N>2. The heat dissipation assembly comprises a heat-absorbing member arranged in the channel. The heat-absorbing member comprises N side walls, wherein the N side walls respectively abut against the side walls of the N battery cells. Compared with the prior art, the battery pack has the advantages that the battery pack assists the battery cell assembly in heat dissipation through the heat dissipation assembly, which can make the temperature of each area of the battery cell assembly more balanced.

20 Claims, 11 Drawing Sheets

BATTERY PACK HAVING HEAT DISSIPATION ASSEMBLY TO ASSIST HEAT DISSIPATION

CROSS REFERENCE TO RELATED APPLICATIONS

The present application is a Continuation Application of U.S. application Ser. No. 17/029,494 filed on Sep. 23, 2020, which claims the priority of CN application Serial No. 201910899648.X, filed on Sep. 23, 2019, the disclosures of which are hereby incorporated by reference in their entirety.

TECHNICAL FIELD

The invention relates to a battery pack.

BACKGROUND ART

The battery pack generally includes a housing, a battery cell assembly disposed in the housing, and a circuit board for controlling the state of charging and discharging of the battery pack. During the use of the battery pack, the battery cell assembly continuously releases heat. When the temperature of the battery cell assembly reaches the temperature value of the thermal protection for the battery cell, the battery pack will stop discharging under the control of the circuit board.

Current battery cell assembly are usually composed of a plurality of cells to form an array. The battery cell located at the edge of the array dissipates heat quickly, while the battery cell located at the center of the array dissipates heat slowly, or even fails to dissipate heat effectively, so that the battery cell at the center of the battery cell assembly reaches the temperature value of the thermal protection for the battery cell fastest, which triggers the protection mechanism of the battery pack, the circuit board controls the battery pack to stop discharging, thereby affecting the normal use of the battery pack and reducing the user experience.

In view of the above problems, it is necessary to provide a battery pack to solve the above problems.

SUMMARY OF INVENTION

The object of the present invention is to provide a battery pack, which assists the heat dissipation of the battery cell assembly through a heat dissipation assembly, which not only can make the temperature of each area of the battery cell assembly more balanced, but also effectively extend the working time of the battery cell assembly and reduce the decay rate of the battery cell assembly, thereby effectively extending the service life of the battery pack.

In order to achieve the above object, the present invention provides a battery pack, which comprises a battery cell assembly including a battery cell array composed of a plurality of battery cells and a channel provided in the battery cell array, the channel being formed by the surrounding of N battery cells, wherein N>2; and a heat dissipation assembly including a heat-absorbing member disposed in the channel, and the heat-absorbing member including N side walls, wherein the N side walls respectively abut against the side walls of the N battery cells.

As a further improvement of the present invention, the heat dissipation assembly comprises a heat-conducting member in contact with the heat-absorbing member to dissipate the heat absorbed by the heat-absorbing member.

As a further improvement of the present invention, the heat-conducting member is disposed along an axial direction of the battery cell, and the heat-conducting member is partially located inside the heat-absorbing member and partially located outside the heat-absorbing member.

As a further improvement of the present invention, the heat-conducting member includes a shaft body disposed along an axial direction of the battery cell and a plurality of heat dissipation fins provided on the arc-shaped sidewall of the shaft body.

As a further improvement of the present invention, the heat-conducting member comprises a cylinder provided with a receiving groove and a plurality of heat dissipation fins, the receiving groove is provided along an axial direction of the cylinder, and one end of the heat dissipation fin is installed on the sidewall of the receiving groove, and the other end extends into the receiving groove, the heat-absorbing member is provided with a receiving cavity for accommodating the cylinder.

As a further improvement of the present invention, the heat-conducting member penetrates the heat-absorbing member along the axial direction of the battery cell.

As a further improvement of the present invention, the battery pack further comprises a housing for accommodating the battery cell assembly and the heat dissipation assembly, and the heat-conducting member is in contact with the housing.

As a further improvement of the present invention, the battery pack further comprises a housing for accommodating the battery cell assembly and the heat dissipation assembly, and the housing is provided with a ventilation hole that cooperates with the heat dissipation assembly.

As a further improvement of the present invention, the heat-conducting member comprises a housing for accommodating the battery cell assembly and the heat dissipation assembly, the heat-conducting member comprises a first heat-conducting member and a second heat-conducting member, one end of the first heat-conducting member and the second heat-conducting member fixed on the housing respectively, and the other end of the first heat-conducting member and the second heat-conducting member respectively inserted into the heat-absorbing member.

As a further improvement of the present invention, the heat-conducting member comprises a housing for accommodating the battery cell assembly and the heat dissipation assembly, the heat-conducting member comprises a heat conductor, a first heat-conducting sheet and a second heat-conducting sheet, the heat conductor penetrates the heat-absorbing member along the axial direction of the battery cell, one end of the first heat-conducting sheet and the second heat-conducting sheet fixed on the housing respectively, and the other end of the first heat-conducting sheet and the second heat-conducting sheet respectively inserted into the heat conductor.

As a further improvement of the present invention, the heat-absorbing member is made of shape-stabilized phase change material.

As a further improvement of the present invention, the heat-absorbing member comprises phase change material and a heat-conducting shell accommodating the phase change material.

In order to achieve the above object, the present invention provides a battery pack, which includes a plurality of battery cells, a frame, and a heat dissipation assembly, the frame is provided with a receiving portion to receive the battery cells, wherein the receiving portion includes a first receiving portion for receiving the N battery cells, the heat dissipation assembly including a heat-absorbing member disposed in the first receiving portion, the heat-absorbing member including N sidewalls, and the N sidewalls respectively resist the N battery cells contained in the first receiving portion, and the N battery cells being located between the heat-absorbing member and the sidewalls of the first receiving portion, wherein N>2.

As a further improvement of the present invention, the heat dissipation assembly comprises a heat-conducting member in contact with the heat-absorbing member to guide the heat absorbed by the heat-absorbing member.

As a further improvement of the present invention, the heat-conducting member is disposed along an axial direction of the battery cell, and a part of the heat-conducting member is located inside the heat-absorbing member and a part of the heat-conducting member is located outside the heat-absorbing member.

As a further improvement of the present invention, the heat-conducting member comprises a shaft body disposed along an axial direction of the battery cell and a plurality of heat dissipation fins provided on the arc-shaped sidewall of the shaft body.

As a further improvement of the present invention, the heat-conducting member comprises a cylinder provided with a receiving groove and a plurality of heat dissipation fins, the receiving groove is provided along an axial direction of the cylinder, and one end of the heat dissipation fin is installed on the sidewall of the receiving groove, and the other end extends into the receiving groove, the heat-absorbing member is provided with a receiving cavity for accommodating the cylinder.

The beneficial effect of the present invention is that the battery pack of the present invention assists the heat dissipation of the battery cell assembly through the heat dissipation assembly, which can not only make the temperature of each area of the battery cell assembly more balanced, but also effectively extend the working time of the battery cell assembly and reduce the decay rate of the battery cell assembly, thereby effectively prolonging the service life of the battery pack.

DESCRIPTION OF EMBODIMENTS

In order to make the objectives, technical solutions, and advantages of the present invention clearer, the present invention will be described in detail below with reference to the drawings and specific embodiments.

Figure 1:
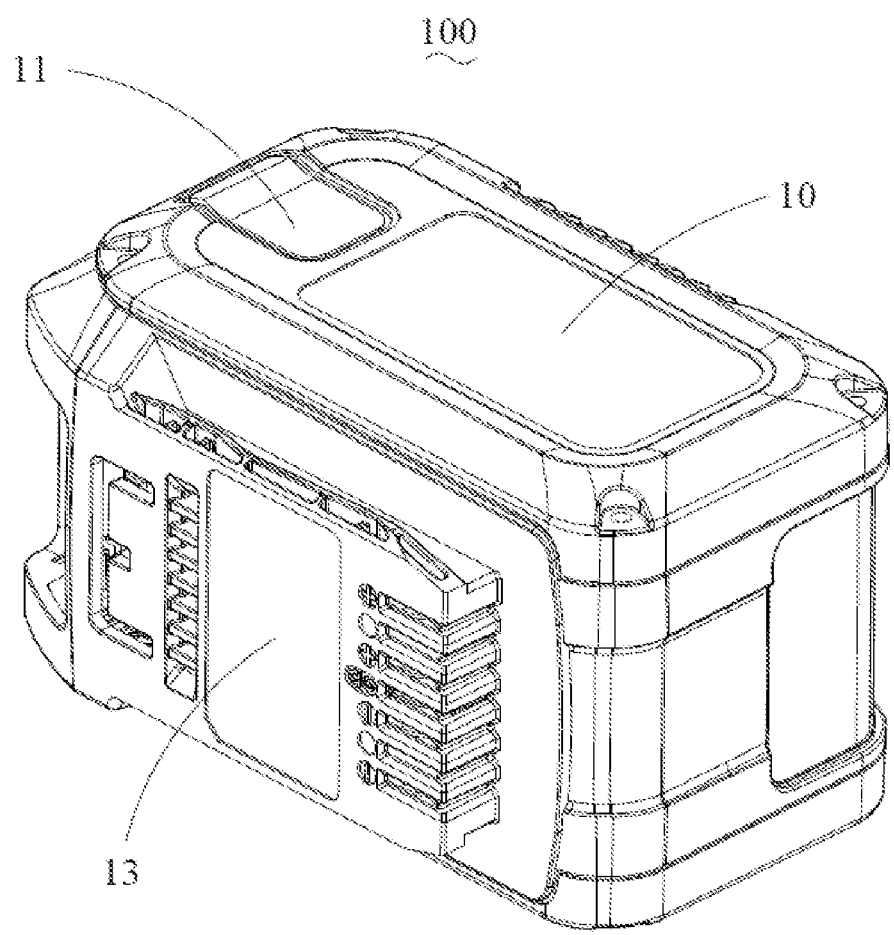
FIG. 1 is a perspective view of a battery pack according to one embodiment of the present invention.
Figure 2:
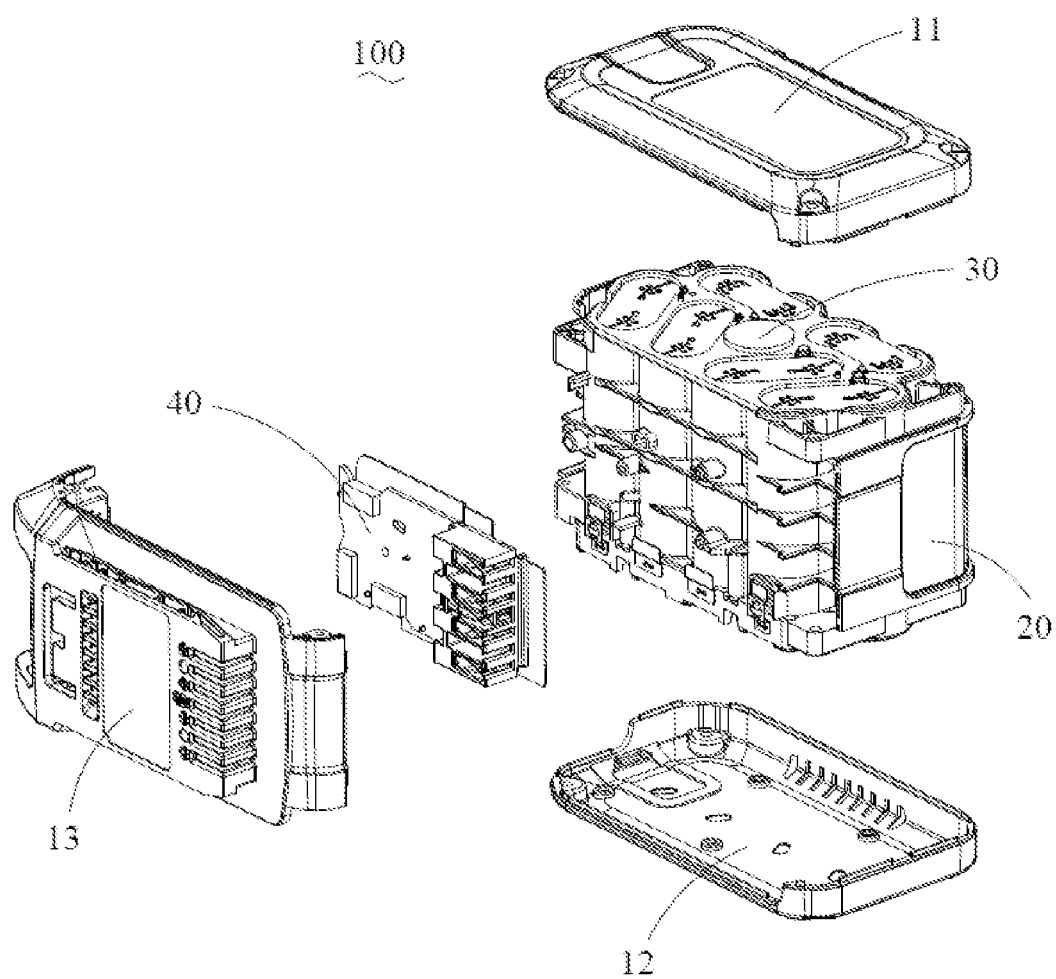
FIG. 2 is an exploded view of the battery pack shown in FIG. 1.

Please refer to FIG. 1 and FIG. 2, the present invention discloses a battery pack 100 including a housing 10, a battery cell assembly 20, a heat dissipation assembly 30 that cooperates with the battery cell assembly 20, and a circuit board 40 for controlling the battery pack 100 in the charged and discharged state. The battery cell assembly 20, the heat dissipation assembly 30, and the circuit board 40 are accommodated in the housing 10.

Please refer to FIG. 1 and FIG. 2, the housing 10 includes a top wall 11, a bottom wall 12 opposite to the top wall 11, and a side wall 13 perpendicular to the top wall 11. The top wall 11, the bottom wall 12, and the side wall 13 are put together to form a receiving space for receiving the battery cell assembly 20, the heat dissipation assembly 30, and the circuit board 40.

Figure 3:
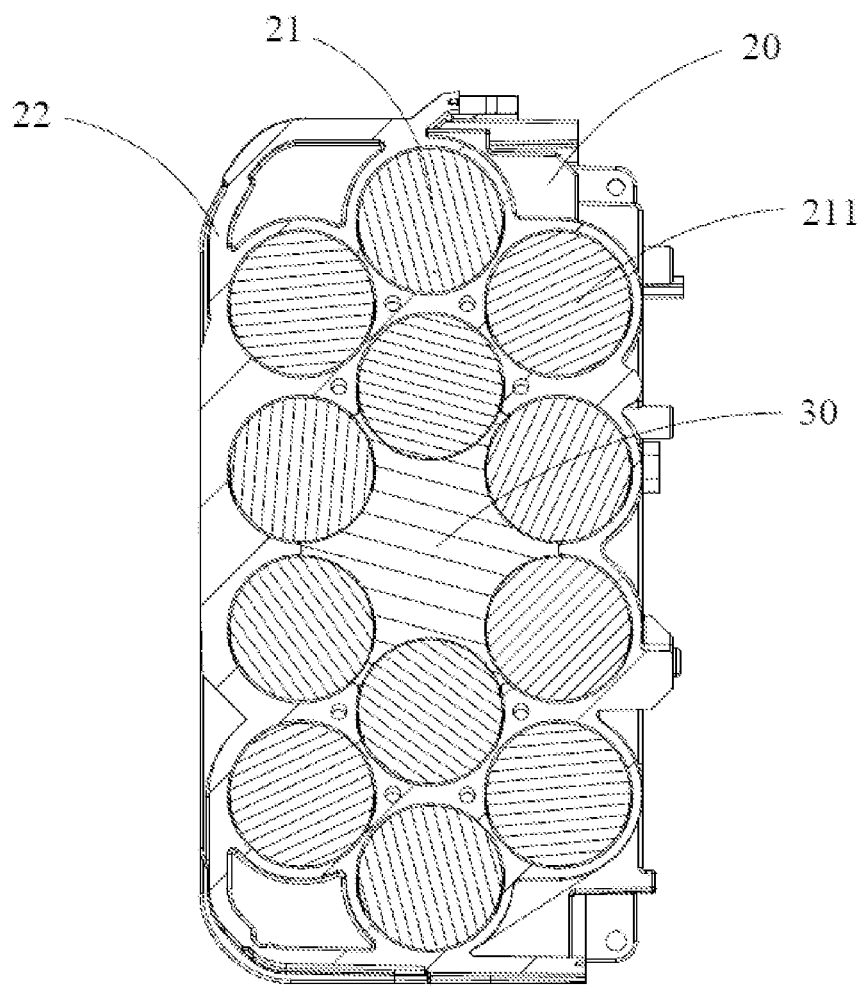
FIG. 3 is a cross-sectional view of a combined structure of a battery cell assembly and a heat dissipation assembly.
Figure 4:
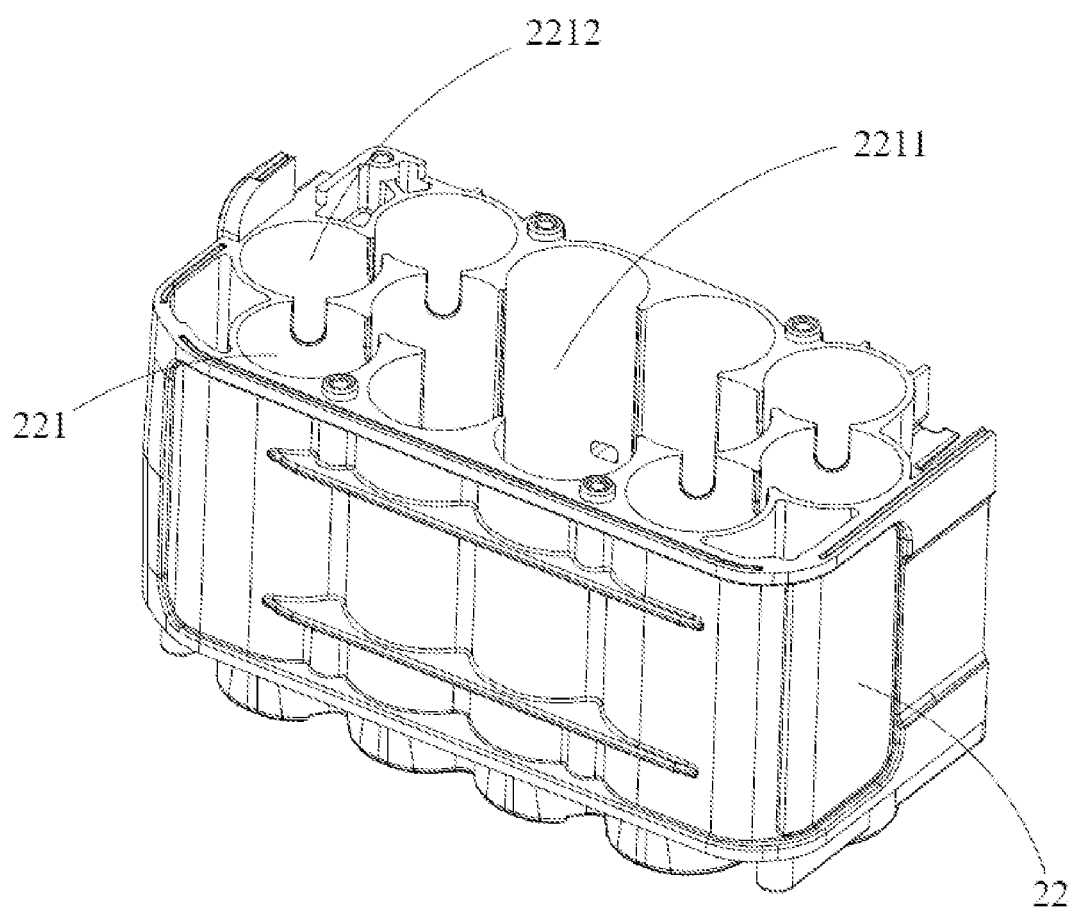
FIG. 4 is a perspective view of a frame.
Figure 5:
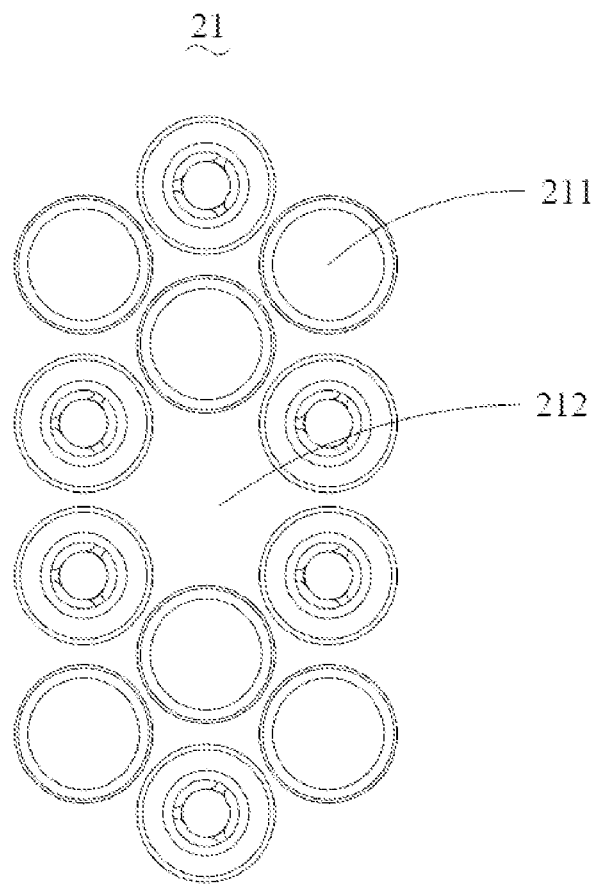
FIG. 5 is a perspective view of a battery cell array.
Figure 12:
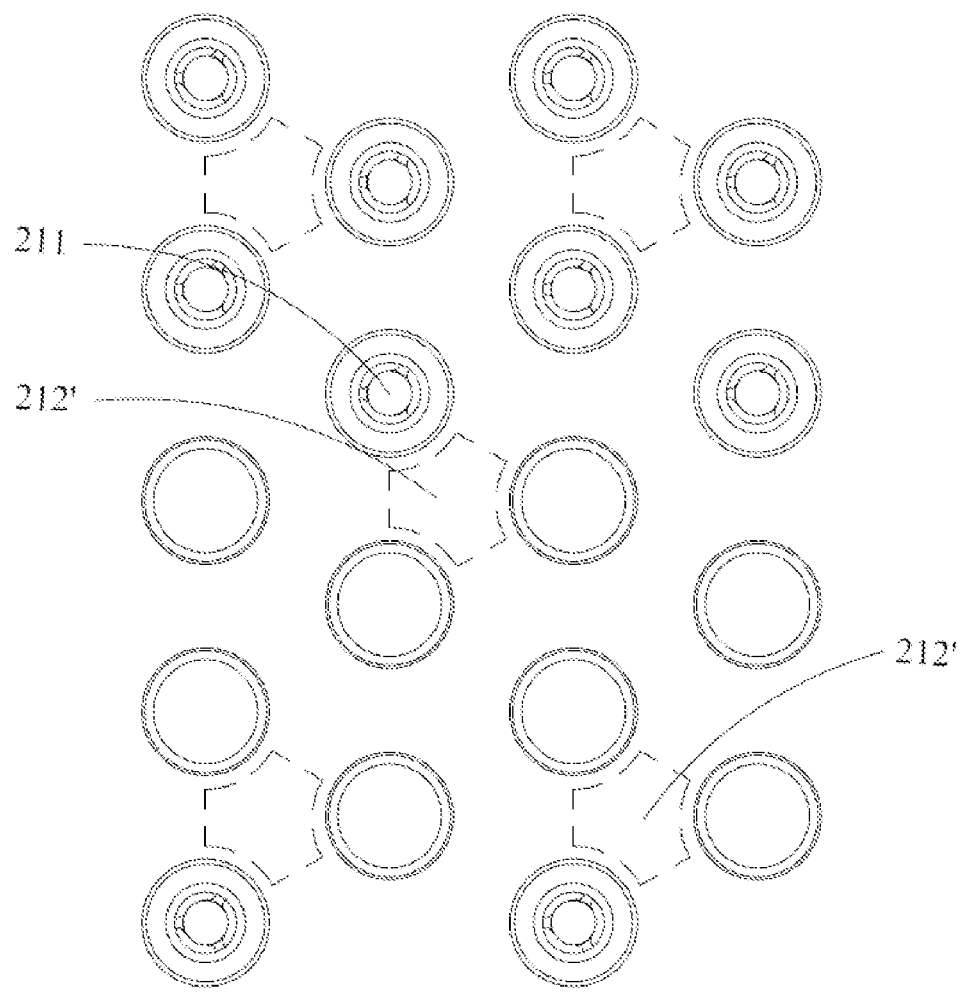
FIG. 12 is a perspective view of a battery cell array having another kind of structure.
Figure 13:
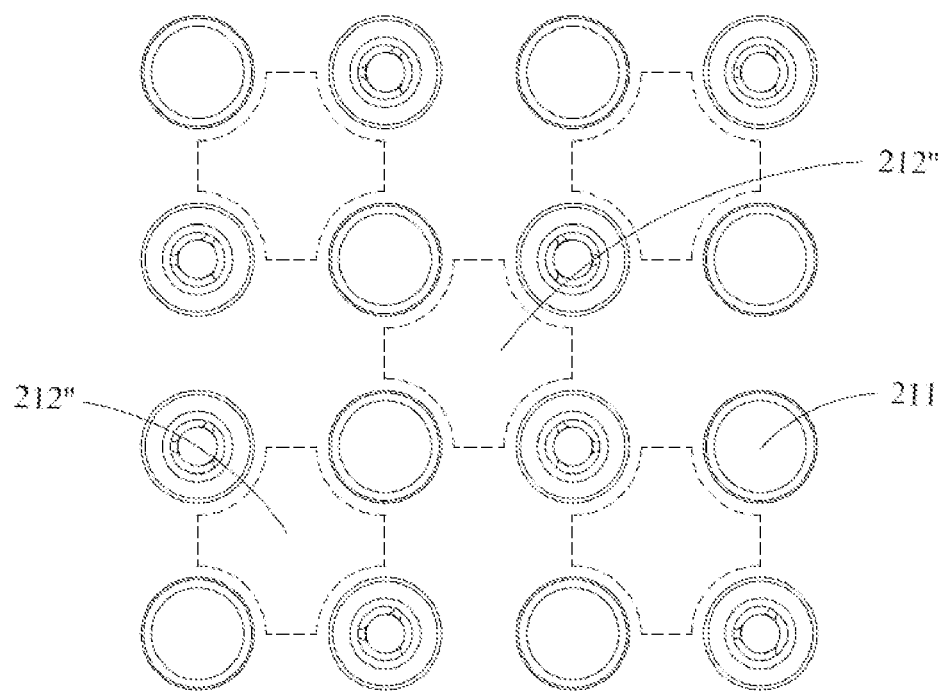
FIG. 13 is a perspective view of the battery cell array having a third king of structure.

Please refer to FIG. 3, FIG. 4 and FIG. 5, the battery cell assembly 20 includes a battery cell array 21 and a frame 22 that receives the battery cell array 21. Please refer to FIG. 5, the battery cell array 21 is composed of a plurality of battery cells 211 arranged in a certain form. A channel 212 is provided in the battery cell array 21, and N battery cells 211 surrounds, forming the channel 212, where N is an integer greater than 2. In this embodiment, the N is 6. Please refer to FIG. 5 and FIG. 6, in this embodiment, in fact the channel 212 is formed by canceling one battery cell 211 in the battery cell array 21, that is, the channel 212 is formed by taking out the battery cell 211 in the battery cell array 21 where the maximum heat is generated. The heat dissipation assembly 30 disposed at the highest heating point in the battery cell array 21 can not only quickly reduce the internal temperature of the battery pack 100, but also this cooling method has the highest efficiency and remarkable effect. Of course, the channel 212 may also have other structural forms. For example, FIG. 12 illustrates a channel 212' (dashed line portion) surrounded by three battery cells 211. FIG. 13 illustrates a channel 212" surrounded by four battery cells 211" (dashed line portion). In this embodiment, the battery cell array 21 is provided with one channel 212, but in other embodiments, the size and number of the channel 212 can be set as required. For example, the battery cell array 21 is provided with two or more channels 212, as shown in FIGS. 12 and 13. It can be understood that, in this embodiment, the cross-sectional shape of the battery cell 211 is circular. However, in other embodiments, the cross-sectional shape of the battery cell 211 may be set as required, such as regular polygon. Please refer to FIG. 4, the frame 22 is provided with a receiving portion 221 to receive the battery cell array 21. The receiving portion 221 includes a first receiving portion 2211 and a second receiving portion 2212. The channel 212 surrounded by the N battery cells 211 and these N battery cells 211 are received in the first receiving portion 2211. The second receiving portion 2212 is used to receive a single battery cell 211. In this embodiment, the second receiving portion 2212 is used to receive a single battery cell, but in other embodiments, the second receiving portion 2212 may also be configured to receive multiple battery cells 211. In this embodiment, the receiving portion 221 has two specifications: a first receiving portion 2211 that accommodates six battery cells 211, and a second receiving portion 2212 that accommodates a single battery cell 211. However, in other embodiments, the specifications of the receiving portion 221 may be provided in various types as required, for example, one receiving portion for receiving six battery cells 211, one receiving portion for receiving three battery cells 211, or multiple receiving portions for receiving a single battery cell 211.

Figure 6:
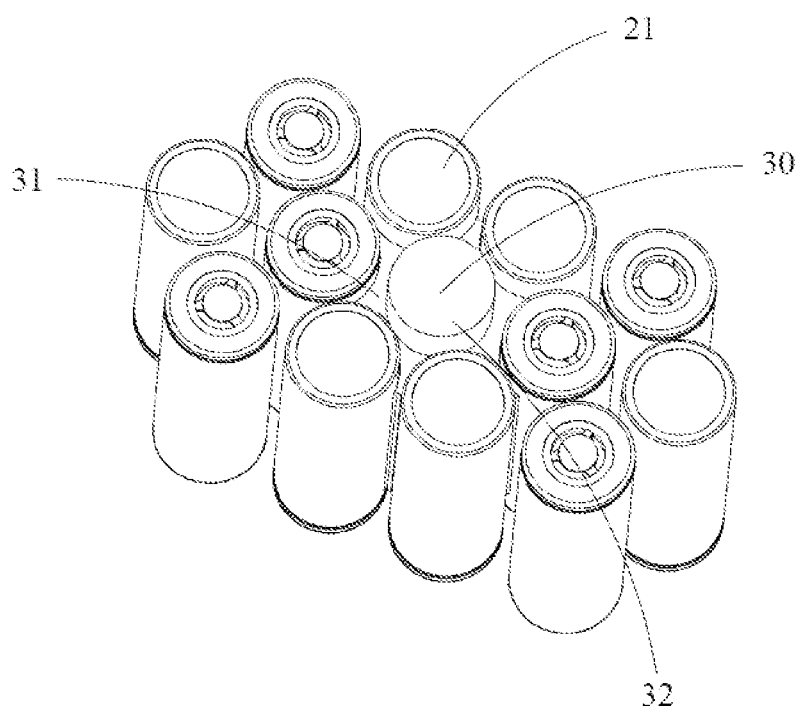
FIG. 6 is a perspective view of a combined structure of a battery cell array and a heat dissipation.
Figure 7:
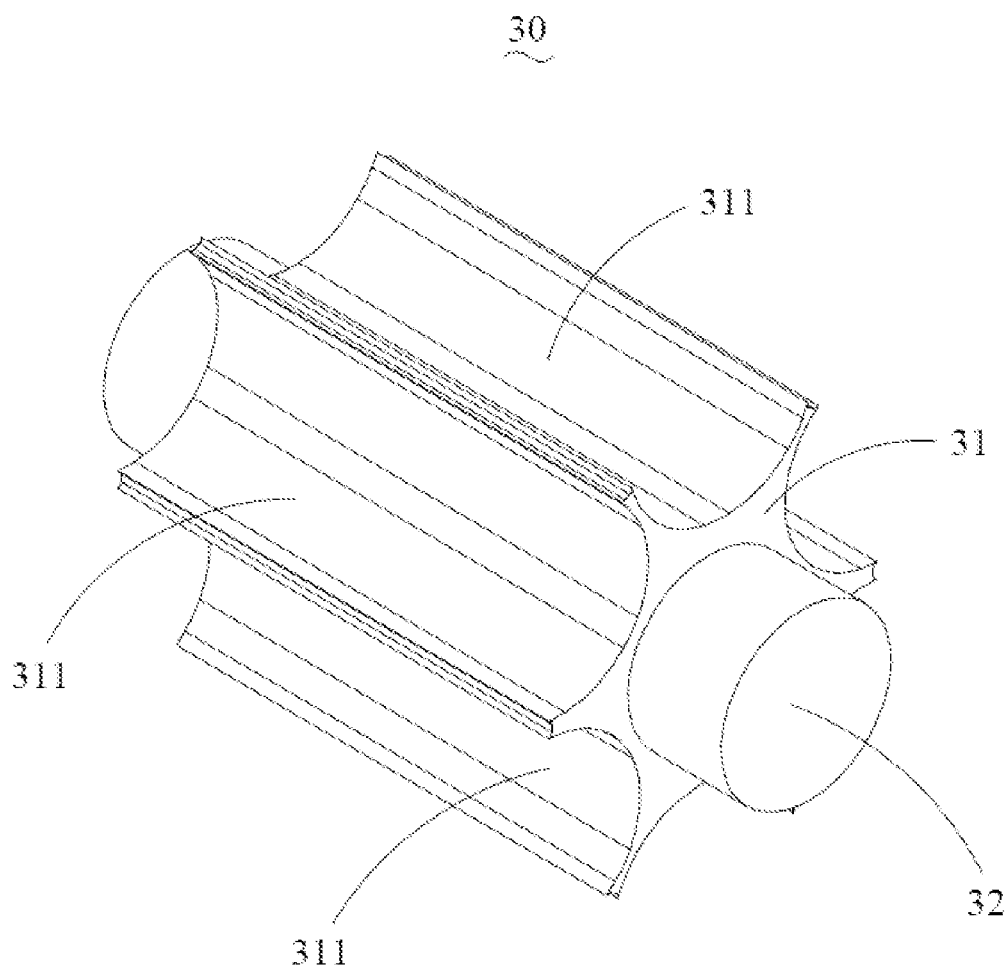
FIG. 7 is a perspective view of a heat dissipation assembly according to a first embodiments.

Please refer to FIG. 6 and FIG. 7, the heat dissipation assembly 30 received in the channel 212 includes a heat-absorbing member 31 and a heat-conducting member 32 in contact with the heat-absorbing member 31. The heat-absorbing member 31 includes N sidewalls 311. The N sidewalls 311 respectively abut against the side walls of the N battery cells 211 so that the heat-absorbing member 31 absorbs the heat from the N battery cells 211, and the battery cells 211 can quickly dissipate heat and cool down. In this embodiment, the side wall 311 is an arc-shaped wall, and its radian matches the radian of the side wall of the battery cell 211. In this embodiment, the heat-absorbing member 31 is made of a shape-stabilized phase change material. However, in other embodiments, the heat-absorbing member 31 may also include the phase change material and a heat-conducting shell accommodating the phase change material, and the phase change material may be shaped or amorphous. The heat-conducting shell is made of a material with high thermal conductivity. It can be understood that the heat-absorbing member 31 may also be made of other materials capable of achieving a heat absorbing function, which is not specifically limited in the present invention. The heat-conducting member 32 is used to conduct the heat absorbed by the heat-absorbing member 31 and dissipate the heat to the outside environment, the heat-conducting member 32 can improve the heat-absorbing efficiency of the heat-absorbing member 31. The heat-conducting member 32 may be made of metal, high thermally conductive plastic, ceramic, or the like. The heat-conducting member 32 is disposed along the axial direction of the battery cell 211 and is partially located inside the heat-absorbing member 31 and partially located outside the heat-absorbing member 31. In this embodiment, the heat-conducting member 32 is cylindrical, and penetrates the heat-absorbing member 31 along the axial direction of the battery cell 211. Both ends of the heat-conducting member 32 may be respectively connected to the top wall 11 and the bottom wall 12, or may not be in contact with the top wall 11 and the bottom wall 12. When the materials of the heat-absorbing member 31 and the heat-conducting member 32 are the same, the heat-absorbing member 31 and the heat-conducting member 32 may be integrally formed. In this embodiment, the cross-section of the heat-conducting member 32 is circular, but in other embodiments, the cross-section of the heat-conducting member 32 may be set as required, which is not specifically limited in the present invention.

Figure 8:
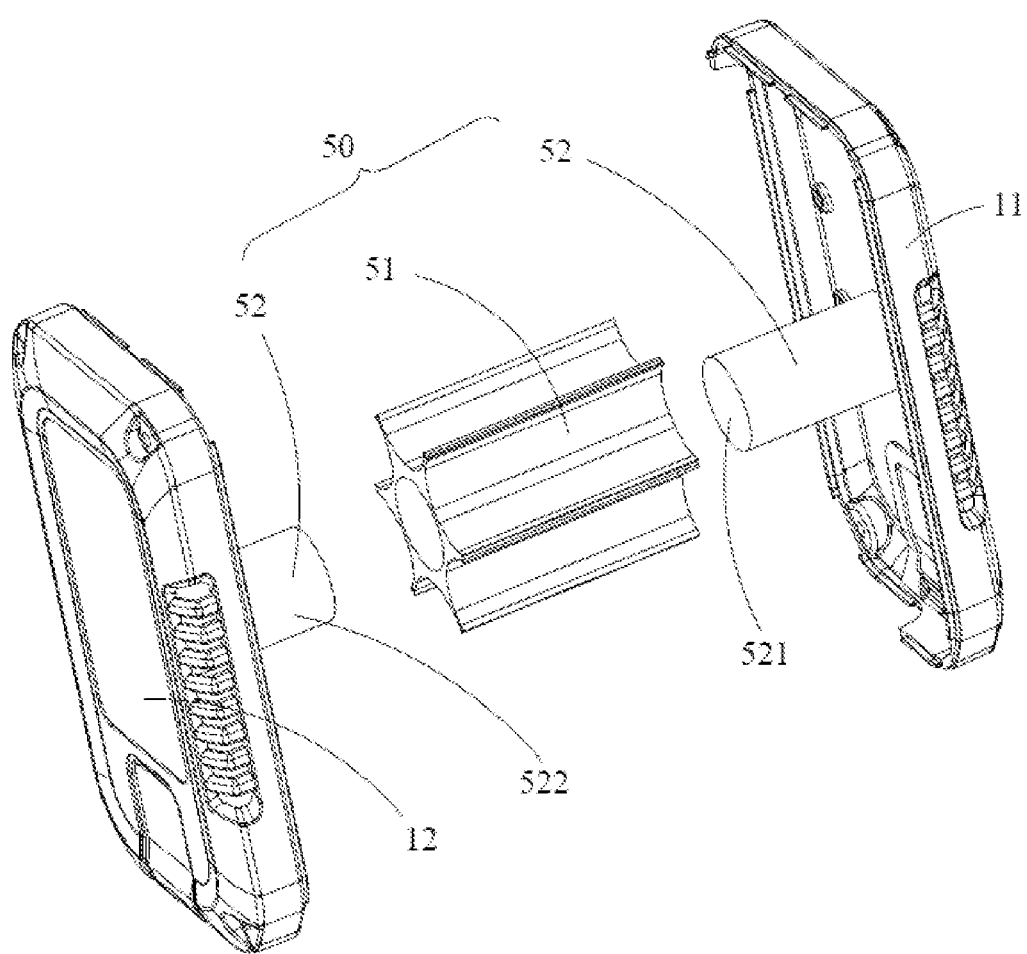
FIG. 8 is a perspective view of a heat dissipation assembly according to a second embodiment.

FIG. 8 shows a heat dissipation assembly 50 according to a second embodiment. The heat dissipation assembly 50 includes a heat-absorbing member 51 and a heat-conducting member 52 in contact with the heat-absorbing member 51. The structure of the heat-absorbing member 51 is substantially the same as that of the heat-absorbing member 31. The heat-conducting member 52 includes a first heat-conducting member 521 and a second heat-conducting member 522. One end of the first heat-conducting member 521 is fixed on the top wall 11, and the other end is inserted into the heat-absorbing member 51. One end of the second heat-conducting member 522 is fixed on the bottom wall 12, and the other end is inserted into the heat-absorbing member 51.

In this embodiment, the heat-conducting member 52 is a split type, but it can be understood that in other embodiments, the first heat-conducting member 521 and the second heat-conducting member 522 may form a whole, and one end is fixed to the top wall 11 or the bottom wall 12 and the other end is inserted into the heat-absorbing member 51.

Figure 9:
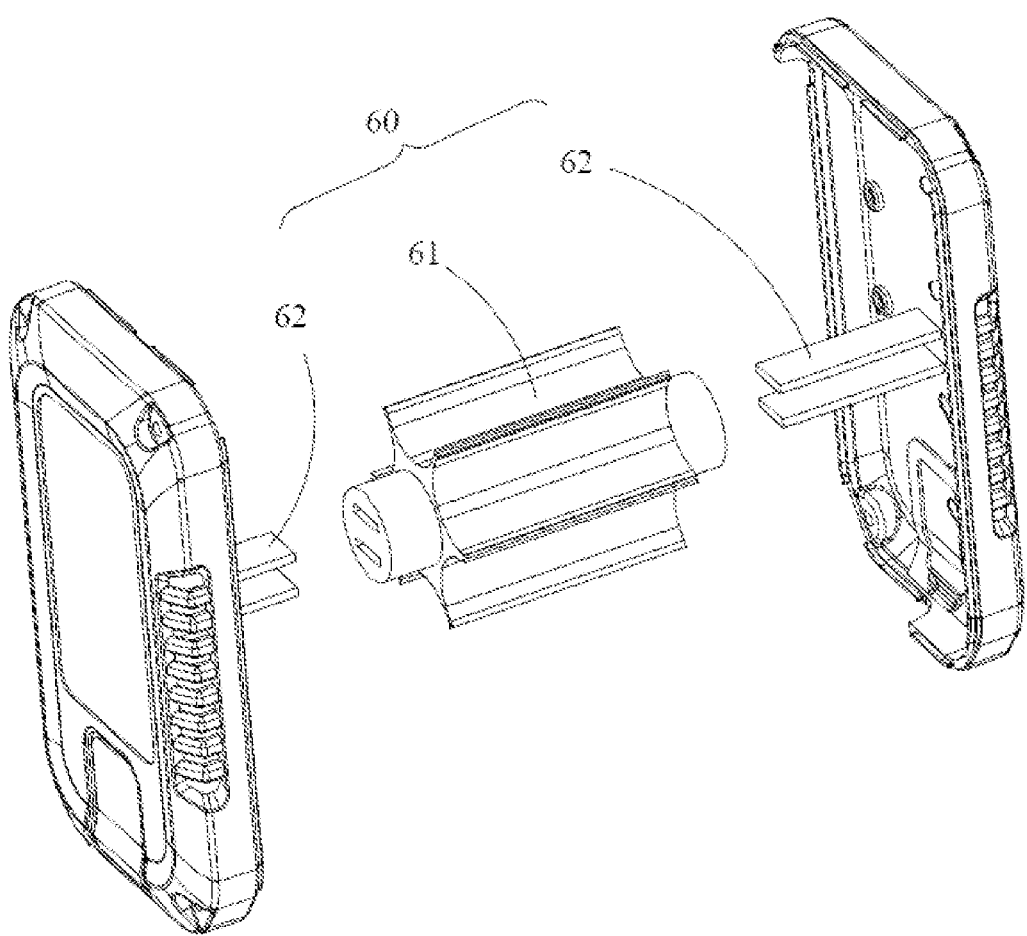
FIG. 9 is a perspective view of a heat dissipation assembly according to a third embodiment.

FIG. 9 shows a heat dissipation assembly 60 according to a third embodiment. The structure of the heat dissipation assembly 60 is substantially the same as that of the heat dissipation assembly 50. The heat dissipation assembly 60 includes a heat-absorbing member 61 and a heat-conducting member 62 in contact with the heat-absorbing member 61. The difference is that the heat-conducting member 62 is a heat conducting sheet, that is, the heat-conducting member 62 includes a first heat-conducting sheet and a second heat-conducting sheet, the first heat-conducting sheet and the second heat-conducting sheet are substantially the same as the first heat-conducting member 521 and the second heat-conducting member 522. In this embodiment, one end of the heat-conducting member 62 is inserted into the heat-absorbing member 61, but it can be understood that in other embodiments, the heat-conducting member 62 further includes a heat conductor penetrates the heat-absorbing member 31 along the axial direction of the battery cell 211, and two ends of the heat conductor protrude from the two ends of the heat-absorbing member 61 respectively, the other end of the first heat-conducting sheet and the other end of the second heat-conducting sheet are respectively inserted into the cylindrical heat conductor.

Figure 10:
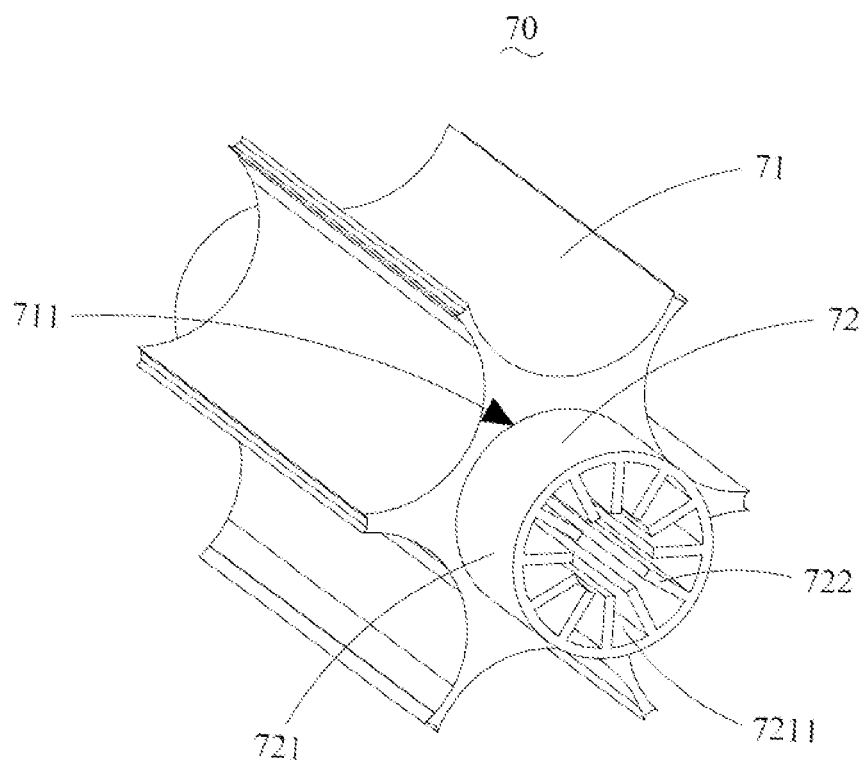
FIG. 10 is a perspective view of a heat dissipation assembly according to a fourth embodiment.

FIG. 10 shows a heat dissipation assembly 70 according to a fourth embodiment. The heat dissipation assembly 70 includes a heat-absorbing member 71 and a heat-conducting member 72 in contact with the heat-absorbing member 71. The heat-absorbing member 71 has the same structure as the heat-absorbing member 31, and a receiving cavity 711 is provided therein. The heat-conducting member 72 includes a hollow cylinder 721 and a plurality of heat dissipation fins 722. The cylinder 721 is disposed in the receiving cavity 711 and abuts against the side wall of the receiving cavity 711. The cylinder 721 is provided with a receiving groove 7211, in this embodiment, the hollow part of the cylinder forms the receiving groove 7211. One end of the heat dissipation fin 722 is installed on the sidewall of the receiving groove 7211, and the other end extends into the receiving groove 7211. It can be understood that, in other embodiments, the heat-conducting member 72 may not have the cylinder 721, and the heat dissipation fin 722 is directly installed on the groove wall of the receiving cavity 711. It can be understood that the top wall 11 and the bottom wall 12 may further be provided with a ventilation hole (not shown) that cooperates with the heat dissipation assembly 70 so as to dissipate heat by air convection.

Figure 11:
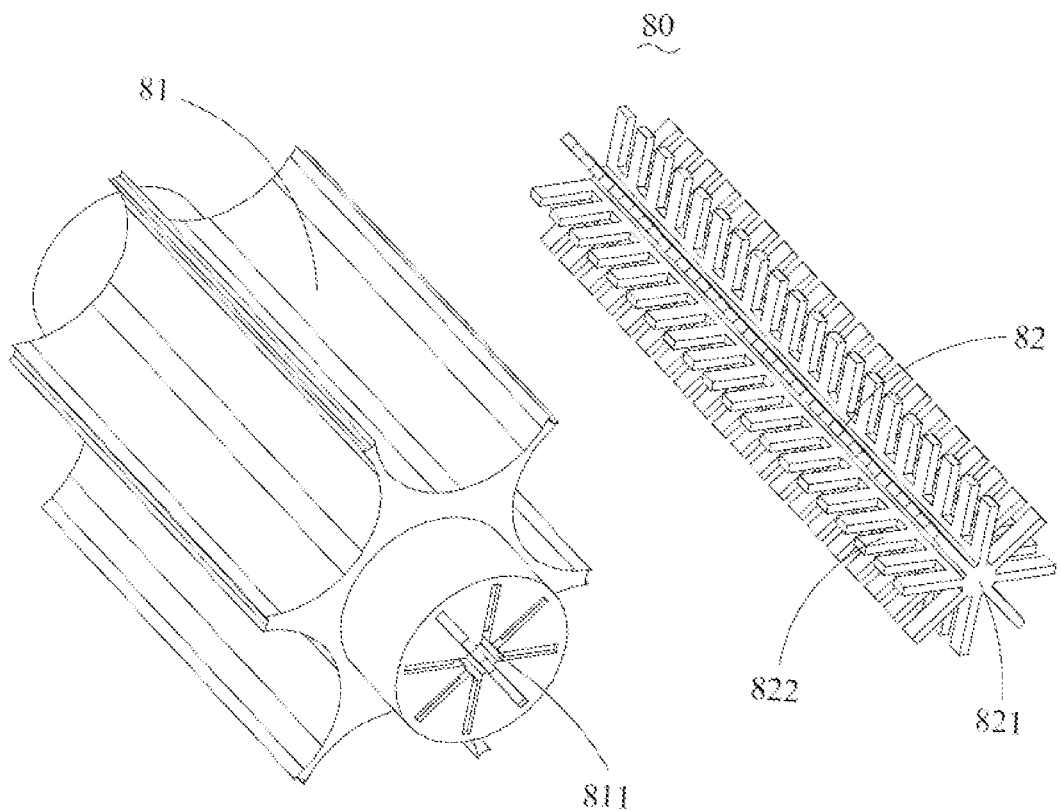
FIG. 11 is a perspective view of a heat dissipation assembly according to a fifth embodiment.

FIG. 11 shows a heat dissipation assembly 80 according to a fifth embodiment. The heat dissipation assembly 80 includes a heat-absorbing member 81 and a heat-conducting member 82 in contact with the heat-absorbing member 81. The structure of the heat-absorbing member 81 is substantially the same as that of the heat-absorbing member 31. A receiving cavity 811 is provided in the heat-absorbing member 81 to receive the heat-conducting member 82. The heat-conducting member 82 includes a shaft body 821 disposed along the axial direction of the battery cell 211 and a plurality of heat dissipation fins 822 disposed on the shaft body 821. The heat dissipation fin 822 is disposed on the arc-shaped sidewall of the shaft body 821. In this embodiment, the plurality of heat dissipation fins 822 has a total of eight rows, and each row of heat dissipation fins 822 forms a straight line parallel to the axis of the shaft body 821. However, it can be understood that the line formed by the dissipation fins 822 in each row may also be a spiral line rotating around the shaft body 821.

Compared with the prior art, the battery pack 100 of the present invention assists the heat dissipation of the battery cell assembly 20 through the heat dissipation assembly 30, 50, 60, 70, 80, which can not only make the temperature of each area of the battery cell assembly 20 more balanced, but also can effectively extend the working time of the battery cell assembly 20 and reduce the attenuation speed of the battery cell assembly 20, thereby effectively prolonging the service life of the battery pack 100.

The above embodiments are only used to illustrate the technical solutions of the present invention, not for limitation. Although the present invention is described in detail with reference to the preferred embodiments, ordinary technicians in the field should understand that the technical solutions of the present invention may be modified or substituted without departing from the spirit and scope of the technical solutions of the present invention.

What is claimed is:

1. A battery pack having heat dissipation assembly to assist heat dissipation, the battery pack comprising:
   a battery cell assembly including a battery cell array composed of a plurality of battery cells and a channel provided in the battery cell array, the channel being formed by surrounding of N battery cells and being large enough to receive one cell from the battery cell array, wherein N is an integer greater than 2; and
   a heat dissipation assembly including a heat-absorbing member disposed in the channel, the heat-absorbing member and the one cell being interchangeable in the channel, and the heat-absorbing member including M side walls respectively abutting against side walls of the N battery cells, wherein M is an integer greater than 2.

2. The battery pack according to claim 1, wherein each of the M side walls of the heat-absorbing member is an arc-shaped wall which radian matches a radian of a side wall of a corresponding battery cell.

3. The battery pack according to claim 1, wherein the heat-absorbing member comprises a first heat-absorbing member having the M side walls and a second heat-absorbing member that penetrates the first heat-absorbing member along an axial direction of the battery cell assembly.

4. The battery pack according to claim 3, wherein the first heat-absorbing member and the second heat-absorbing member are integrally formed.

5. The battery pack according to claim 3, wherein the first heat-absorbing member is made of shape-stabilized phase change material.

6. The battery pack according to claim 3, wherein the first heat-absorbing member comprises a phase change material and a heat-conducting shell accommodating the phase change material.

7. The battery pack according to claim 3, wherein the second heat-absorbing member is partially located inside the first heat-absorbing member and partially located outside the first heat-absorbing member.

8. The battery pack according to claim 3, wherein the second heat-absorbing member is cylindrical.

9. The battery pack according to claim 3, wherein the battery pack further comprises a housing for accommodating the battery cell assembly and the heat dissipation assembly, and the second heat-absorbing member is in contact with the housing.

10. The battery pack according to claim 9, wherein the housing includes a top wall and a bottom wall opposite to the top wall, and the second heat-absorbing member is in contact with the top wall and the bottom wall.

11. The battery pack according to claim 10, wherein a first end and a second end of the second heat-absorbing member are respectively connected to the top wall and the bottom wall.

12. The battery pack according to claim 1, wherein the channel comprises a plurality of channels.

13. The battery pack according to claim 12, wherein each of the plurality of channels has a same surrounding in a number of the battery cells.

14. The battery pack according to claim 1, wherein a cross-sectional shape of each battery cell is circular or regular polygon.

15. The battery pack according to claim 1, wherein the battery cell assembly comprises a frame that receives the battery cell array.

16. The battery pack according to claim 15, wherein the channel is located at a center of the frame.

17. The battery pack according to claim 15, wherein the frame comprises a first receiving portion used to receive the battery cell array and a second receiving portion used to receive a single battery cell.

18. The battery pack according to claim 17, wherein the second receiving portion locates around the first receiving portion.

19. The battery pack according to claim 18, wherein the second receiving portion comprises a plurality of second receiving portion that are symmetrically distributed around the first receiving portion.

20. A battery pack having heat dissipation assembly to assist heat dissipation, the battery pack comprising:
   a battery cell assembly including a battery cell array composed of a plurality of battery cells and a channel provided in the battery cell array, the channel being formed by surrounding of N battery cells and being large enough to receive one cell from the battery cell array, wherein N is an integer greater than 2;
   a heat dissipation assembly including a heat-absorbing member disposed in the channel, the heat-absorbing member and the one cell being interchangeable in the channel, and the heat-absorbing member including M side walls respectively abutting against side walls of the N battery cells, wherein M is an integer greater than 2;
   a circuit board for controlling the battery pack in a charged and a discharged state; and
   a housing including a top wall, a bottom wall opposite to the top wall, and a side wall perpendicular to the top wall, the top wall, the bottom wall, and the side wall being put together to form a receiving space;
   wherein the battery cell assembly, the heat dissipation assembly, and the circuit board are accommodated in the receiving space.

* * * * *